(12) United States Patent
Boyce

(10) Patent No.: US 11,160,254 B2
(45) Date of Patent: Nov. 2, 2021

(54) ANIMAL SKIRT GUARD FOR BREEDING PREVENTION

(71) Applicant: Ann Marie Boyce, Huntington, WV (US)

(72) Inventor: Ann Marie Boyce, Huntington, WV (US)

( * ) Notice: Subject to any disclaimer, the term of this patent is extended or adjusted under 35 U.S.C. 154(b) by 253 days.

(21) Appl. No.: 16/407,853

(22) Filed: May 9, 2019

(65) Prior Publication Data
US 2020/0352137 A1   Nov. 12, 2020

(51) Int. Cl.
*A01K 21/00* (2006.01)

(52) U.S. Cl.
CPC .................... *A01K 21/00* (2013.01)

(58) Field of Classification Search
CPC ...... A01K 21/00; A01K 23/00; A01K 13/006; A01K 31/008; A01K 29/00; A01K 27/002
See application file for complete search history.

(56) References Cited

U.S. PATENT DOCUMENTS

| 311,267 | A | | 1/1885 | Springstun |
|---|---|---|---|---|
| 318,973 | A | | 6/1885 | Fenton |
| 566,480 | A | | 8/1896 | Shank |
| 700,558 | A | | 5/1902 | Pinney |
| 708,271 | A | | 9/1902 | Stalker |
| 1,075,237 | A | | 10/1913 | Weihl |
| 1,514,919 | A | * | 11/1924 | Millsap ................ 119/838 |
| 2,175,964 | A | | 10/1939 | Larsen |
| 2,625,134 | A | * | 1/1953 | Massey ................ 119/838 |
| 2007/0101687 | A1 | | 5/2007 | Draper |
| 2012/0318211 | A1 | * | 12/2012 | Madonna ............ A01K 27/00 119/792 |
| 2017/0156295 | A1 | * | 6/2017 | Zoltanski ............ A01K 23/00 |

OTHER PUBLICATIONS http://ukerdis.eu/sheep/2017/10/25/apron.html.
https://www.houseofbacchuspetsupplies.com/anti-mating-aprons-s/118.htm.
http://www.cloventrailfarm.com/buckApron.html.

* cited by examiner

*Primary Examiner* — Joshua J Michener
*Assistant Examiner* — Henry Hooper Mudd
(74) *Attorney, Agent, or Firm* — Brian W. Foxworthy; Robert R. Waters; Waters Law Group, PLLC

(57) ABSTRACT

A breeding prevention guard comprises a girth strap around the body of an animal and an apron suspended from the girth strap. A sternal strap connected between a neck strap and the girth strap maintain the girth strap and apron in the desired location. Some embodiments may employ a back strap to shape the apron. Some embodiments may employ a second girth strap and a second apron. Some embodiments may employ two girth straps with a single apron suspended from the rearward girth strap. Some embodiments may comprise an additional sternal strap for animals having a more highly convex chest. In those embodiments, the two sternal straps would pass down opposite sides of the chest of the animal.

18 Claims, 7 Drawing Sheets

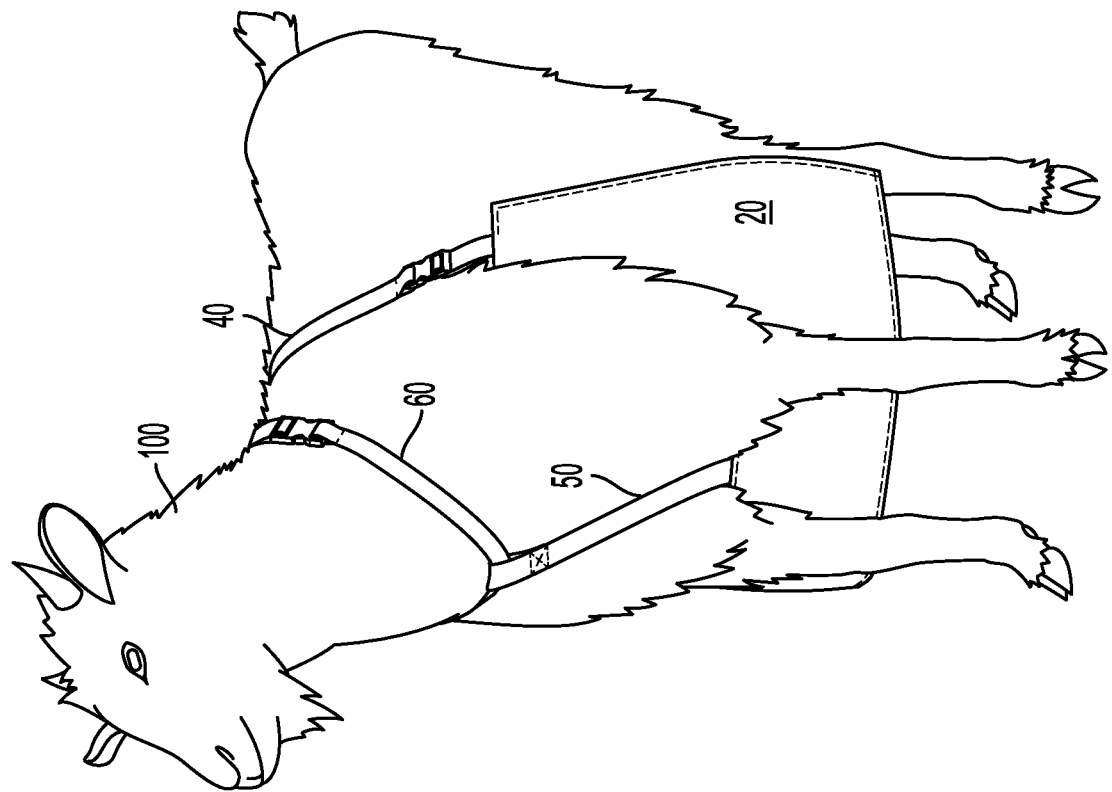
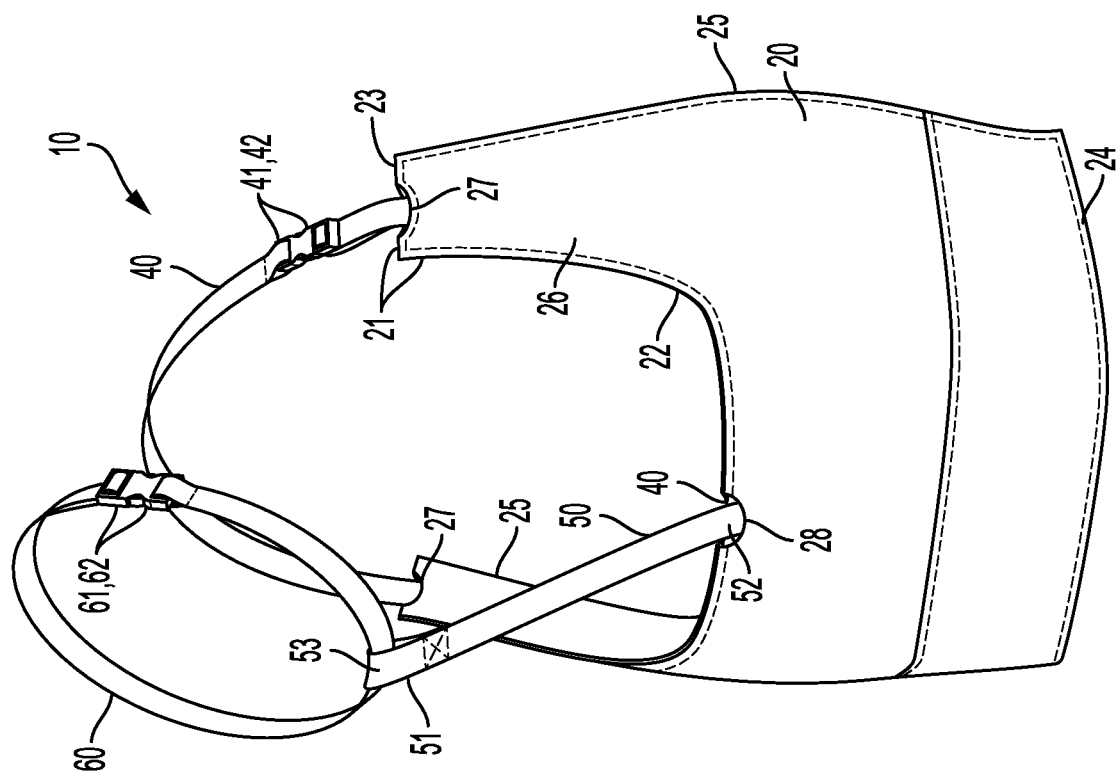
FIG. 1
FIG. 2

ANIMAL SKIRT GUARD FOR BREEDING PREVENTION

FIELD OF THE INVENTION

This invention relates generally to preventing the uncontrolled breeding of livestock. More specifically, this invention relates to a guard placed on a male livestock animal to prevent it from breeding.

BACKGROUND OF THE INVENTION

In animal husbandry, it is sometimes preferred to keep the male and female livestock together, in particular, a single male among the females. However there may be a large mix of male and female of various ages present within a group of livestock. Although that is the convenient way to maintain livestock, it is not always desirable that they breed at will.

Additionally, some livestock such as goats have other behaviors that are desirable to control and curtail. For example, male goats may urinate upon themselves, particularly, up around their upper body. This can result in health issues with goats, such as infections around the face and so on.

One approach to preventing uncontrolled breeding of livestock is the attachment of a guard to the male animals. The guards generally consist of at least a harness and an apron. The harness attaches to the animal and hangs the apron down below the chest floor. The apron blocks attempted breeding. For the guard to be effective, the harness must consistently maintain the apron in the desired position. However, if the configuration of the harness requires the harness to be overly tight, it may chafe the animal, causing injury, such as sores, etc. Furthermore, an overly tight harness may fail to return to the desired position on the occasions that it becomes displaced. Alternatively, a harness that is too loose allows the apron to be dislodged from the desired location too easily. Whether too tight or too loose, an ineffective harness may cause the apron to only intermittently be in the desired location and compromise the effectiveness of the device.

Relevant Art

U.S. Pat. No. 1,075,237 by Wiehl is for a "Preventive Intercourse Apron". In Wiehl, an apron made of flexible material is sewn into the wool on the chest of a ram or like animal. The apron hangs down from the chest and prevents breeding by the animal having the apron attached to it.

U.S. Pat. No. 1,514,919 by Millsap is for a "Harness". In Millsap, the harness is comprised of a neck band, a shoulder band, and a girth band and adjustable straps connecting them. A flexible shield hangs down from the girth band.

U.S. Pat. No. 2,625,134 by Massey is for an "Antibreeding Shield and Harness for Bulls". In Massey, the harness is comprised of belly and back bands passing around the abdomen of the bull, a crupper strap passing around the tail of the bull and attaching to the back band, a neck yoke attaching to the belly band, rear strut straps attaching the crupper strap to the belly band, and front strut straps attaching the neck yoke to the belly strap. A shield is hingedly suspended from the belly strap.

SUMMARY

Embodiments of the apparatus of the present invention comprise an apron that hangs down from the chest floor of the male animal. The apron is attached with straps designed and located to be stabilized by the structure and contour of the animal. The apron has a concave top edge near the chest floor, which may contact the chest floor, and a bottom edge opposite the concave top edge. In some embodiments, the top edge may be concave along only a section of the top edge. The concave section of the top edge of the apron has a strap tunnel running along its length. Each end of the strap tunnel has an aperture at the end of the concave section. Additionally, the concave section has an intermediate aperture located between the apertures at the ends of the strap tunnel at the bottom of the concave section. A girth strap runs through the strap tunnel of the concave section and has complimentary connectors at each end of the strap. These connectors are able to attach to each other and close the strap. This girth strap is one of the straps that hold the apron in place on the livestock. It encircles the body. A sternal strap is also present in embodiments of the invention. It is located in the area of the sternum, or chest. The sternal strap has two ends with a loop at each end. A first end of the sternal strap inserts through the intermediate aperture of the strap tunnel of the apron and the girth strap passes through the loop at this first end of the sternal strap. The apparatus also has a neck strap which has complimentary connectors at each end to close the neck strap about the neck of the livestock. This neck strap may be sized to fit around the base of the neck. It inserts through the loop at the second end of the sternal strap.

With the device installed on livestock the neck strap, the sternal strap, and the girth strap maintain the apron in the optimum position for the purpose of preventing uncontrolled breeding and in the case of goats from spraying themselves. The loops of the sternal strap provide slidable connections between the girth strap and the sternal strap and also the neck strap and the sternal strap. This allows the neck strap and sternal strap and the girth strap and sternal strap to slide with respect to each other with the motion of the animal. These sliding connections allow adjustment of the apparatus as the livestock wears them and avoids creating binding points on the livestock. Some embodiments of the guard may have additional straps around the body of the livestock and may have an additional apron.

The complimentary connecting elements at the ends of the neck strap may be any effective known connecting elements. For example, a snapping buckle in two pieces could be attached to the neck strap. Other possibilities include apertures in the neck strap near one of its ends and a buckle on the other end, with the buckle having a prong for inserting into different apertures to produce different circumferences for the neck strap. The neck strap may be adjustable with a sliding buckle and loop in the neck strap to properly fit the animal. The sternal strap may also be adjustable to fit the animal. The girth strap may also have any effective coupling elements on it such as snapping buckles, or buckle with prong combined with apertures in the other end of the girth strap. The girth strap may also be adjustable in length, to accommodate the various sizes of livestock, also to accommodate growth.

Some embodiments of the apparatus may allow an apron to be increased in size. Initially an apron's bottom edge may be defined by folding up a bottom portion of the apron and attaching the apron to itself. The fold, or crease, created by this attaching of the apron to itself will be what defines the bottom edge of the apron. If it is desirable to have a longer apron at some point, the apron can be detached from itself. This will free up additional length of apron to hang down. The folded portion of the apron may be attached with any effective known elements or methods, such as sewing, buttons, snaps, zippers, staples, etc. Increasing the length of the apron can be done for a livestock as it is growing.

BRIEF DESCRIPTION OF THE DRAWINGS

Additional utility and features of embodiments of the invention will become more fully apparent to those skilled in the art by reference to the following drawings, which illustrate some of the primary features of embodiments of the breeding prevention apparatus.

FIG. 1 is a perspective view of an embodiment of a guard to prevent animal breeding.

FIG. 2 is a perspective view of an embodiment of a breeding guard in place on a goat.

DETAILED DESCRIPTION OF EMBODIMENTS

Figure 4:
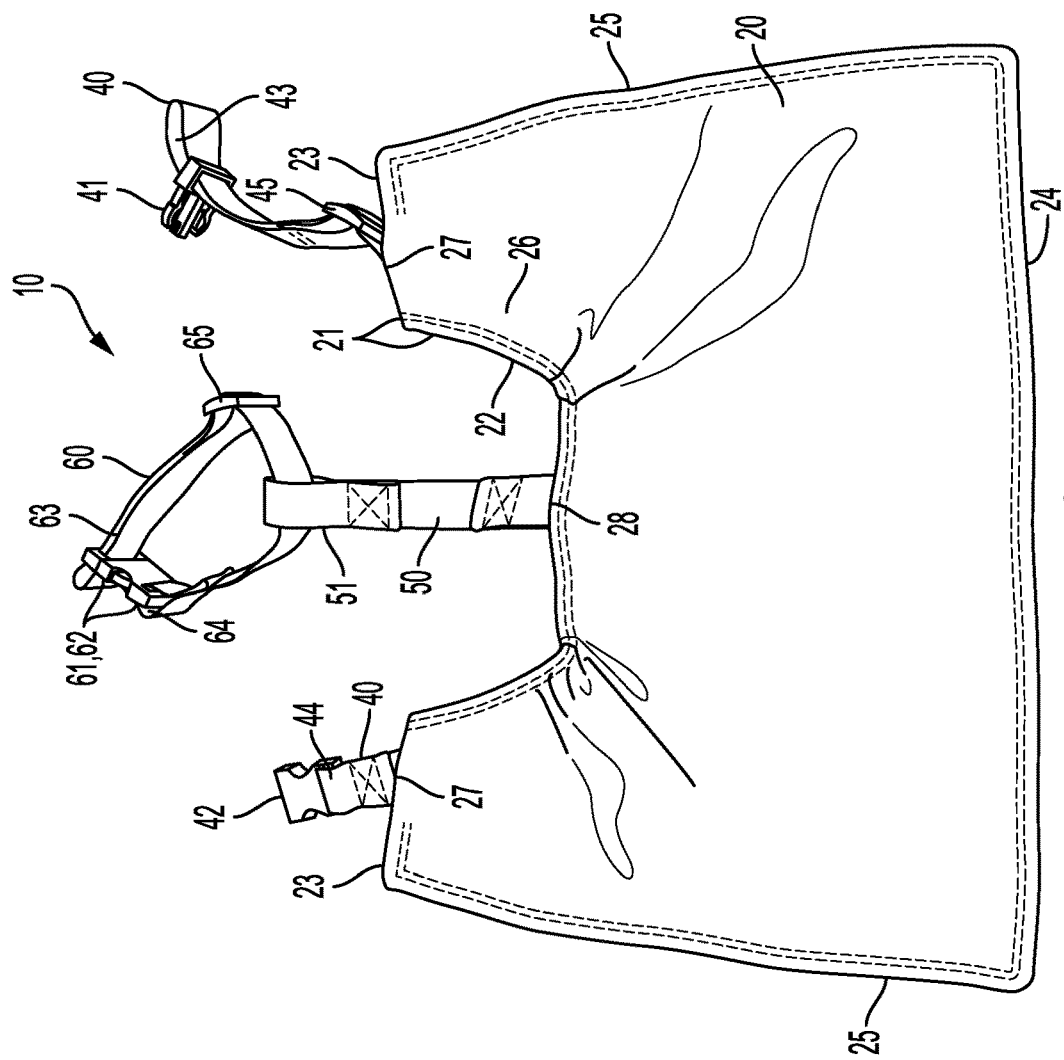
FIG. 4 is a front view of a breeding guard, according to one embodiment of the invention.

FIG. 1 is a perspective view of an embodiment of a guard 10 to prevent animal breeding. Apron 20 performs the actual function of blocking breeding attempts by a male quadruped, such as billy goats, bulls, dogs, etc. Girth strap 40 passes around the body of a quadruped and suspends apron 20. Sternal strap 50 slidably attaches to girth strap 40 and maintains apron 20 in position by slidably attaching at its other end to neck strap 60 which encircles the neck of the quadruped.

In the embodiment of guard 10 in FIG. 1, apron 20 has a top edge 21, a bottom edge 24 opposite of top edge 21, and two sides 25 connecting top edge 21 and bottom edge 24. In the embodiment of FIG. 1, top edge 21 is comprised of a concave central section 22 with two extension sections 23 at each end of central section 22. Central section 22 of top edge 21 is curved to fit the chest of the animal for which it is intended. The length, depth, and curvature of central section 22 may vary depending on the intended use of guard 10. Extension sections 23 add width to top edge 21 of apron 20 and can vary depending on the intended use as well.

Apron 20 of the embodiment of FIG. 1 also has strap tunnel 26 running along the length of central section 22. Strap tunnel 26 has an end aperture 27 at each of its ends and an intermediate aperture 28 located centrally along its length. Girth strap 40 passes through strap tunnel 26, and strap tunnel 26 guides girth strap 40 along top edge 21 of apron 20, thereby providing a sliding connection between a connected section of apron 20 and girth strap 40 along the length of strap tunnel 26. This avoids high stress points that would be present if girth strap 40 were sewn to apron 20. The sliding interaction between strap tunnel 26 and girth strap 40 allows apron 20 and girth strap 40 to adjust and move with respect to each other as the animal wearing guard 10 moves. If a girth strap is fixedly sewn to an apron as with some prior art aprons, when the apron shifts around the body of an animal, it has limited means of self adjustment to re-center itself. The sliding connections between strap tunnel 26 of apron 20 and girth strap 40 of the various embodiments of guard 10 allows apron 20 to return to the desired position. The sliding connection between girth strap 40 and apron 20 are preferred in situations where the animal will not be closely monitored, for long term use, and/or for use in environments that pose entanglement risks. However, apron 20 may be connected to the girth strap 40 by any effective known means.

Sternal strap 50 inserts through intermediate aperture 28 in strap tunnel 26 to connect with girth strap 40. In the embodiment of FIG. 1, sternal strap 50 is of a fixed length and has a loop 51 at both ends 52 and 53. Lower end 52 of sternal strap 50 inserts into strap tunnel 26 of apron 20 and girth strap 40 inserts through loop 51 at lower end 52 of sternal strap 50. This provides a sliding connection between girth strap 40 and sternal strap 50. This allows guard 10 to readjust when needed as the animal moves about and in some cases attempts to thwart guard 10 or maneuvers through an environment with snags, such as branches and fencing.

At its upper end 53, sternal strap 50 connects with neck strap 60. Neck strap 60 inserts through loop 51 at upper end 53 of sternal strap 50. This provides a sliding connection between sternal strap 50 and neck strap 60 and contributes to the ability of guard 10 to readjust to movement of the animal and avoid pinching and rubbing the animal. Sternal strap 50 may connect to neck strap 60 and girth strap 40 by any known means. In the embodiment of FIG. 1, neck strap 60 is adjustable in length.

Figure 3:
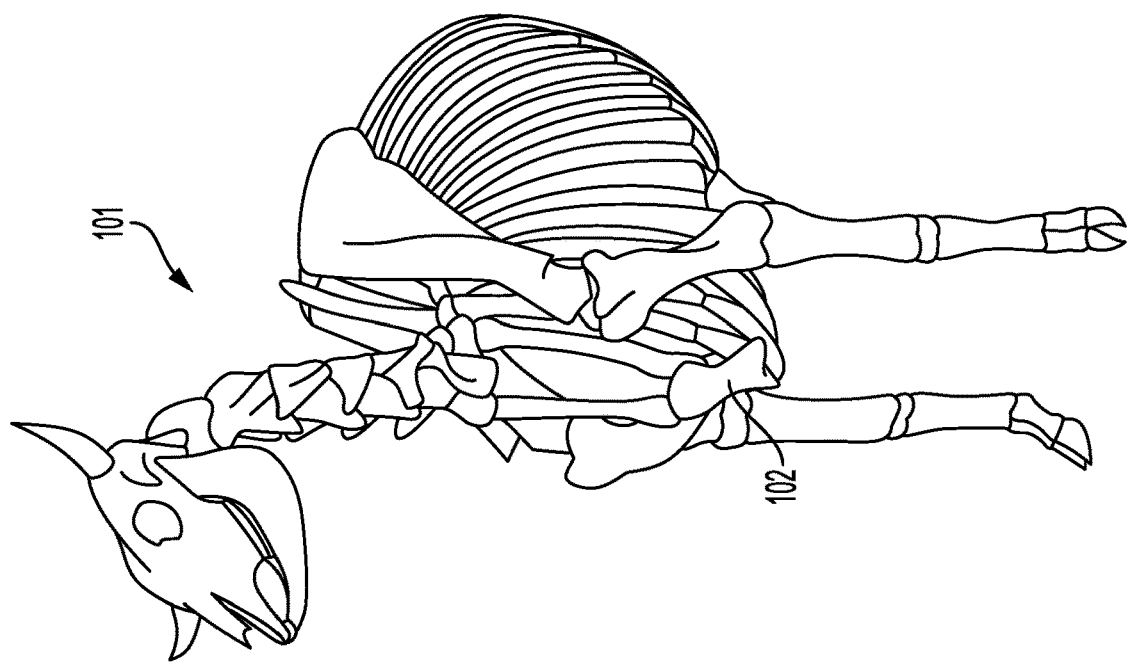
FIG. 3 is a perspective view of a quadruped skeleton.

FIG. 2 is a perspective view of an embodiment of guard 10 in place on a livestock 100, a goat in this case. FIG. 3 is a perspective view of a quadruped skeleton 101. FIGS. 2 and 3 illustrate how guard 10 conforms to the anatomy of a quadruped. To be effective, guard 10 must maintain apron 20 in an optimum position. However, an animal may attempt to reposition a guard, or the animal may maneuver through environmental snags. Either situation may thwart a guard. Goats, in particular, can be persistent and clever in dislodging an apron from its desired location. If a girth strap is employed by itself to maintain an apron in location, it requires the girth strap to be adjusted tightly about the body of the animal, and the guard still may be snagged or pulled off by the environment or animal. This leads to chafing of the animal and wear of the guard. Additionally, with the girth strap adjusted that tightly, a guard may be slow to readjust. If an apron is moved to one side, an overly tight girth strap may maintain it there for a period of time, reducing the effectiveness of a guard. Embodiments of guard 10 of the present application keep apron 20 in the desired location without requiring an overly tight girth strap 40.

Neck strap 60, sternal strap 50, and girth strap 40 maintain apron 20 in the desired location along the body of the animal. Neck strap 60 is adjustable so that it can be positioned to encircle the neck near the back and shoulders of the animal. Neck strap 60 may be adjusted to be positioned at the base of the neck, which is the point on the neck with the least amount of motion when the neck rotates. This avoids any constriction of the neck while also providing an anchor for sternal strap 50. Neck strap 60 passes through loop 51 of sternal strap 50 which hangs from the low point of neck strap 60, centering sternal strap 50 in the chest of the animal. Sternal strap 50 begins at the area of the top of the sternum and ends at the area of the bottom of the sternum, or chest floor. At its lower end 52, sternal strap 50 is situated between the front legs and retained in a central position by the front legs. As may be seen in FIG. 3, the skeletons 101 of many quadrupeds have a sternum 102 centered in the chest. Girth strap 40 passes through loop 51 at lower end 52 of sternal strap 50 which is situated at the chest floor. Girth strap 40 is adjustable so that it can be positioned to encircle the girth of the animal. Neck strap 60, sternal strap 50, and girth strap 40 maintain apron 20 in position longitudinally along the body of the livestock 100 while conforming to the anatomy of the animal and avoiding chafing of the animal. The sliding connections between sternal strap 50 and neck strap 60, girth strap 40 and sternal strap 50, and apron 20 and girth strap 40 maintain apron 20 in the desired position without requiring a tight fit on the animal and allows guard 10 to readjust if it is shifted by the animal.

Figure 5:
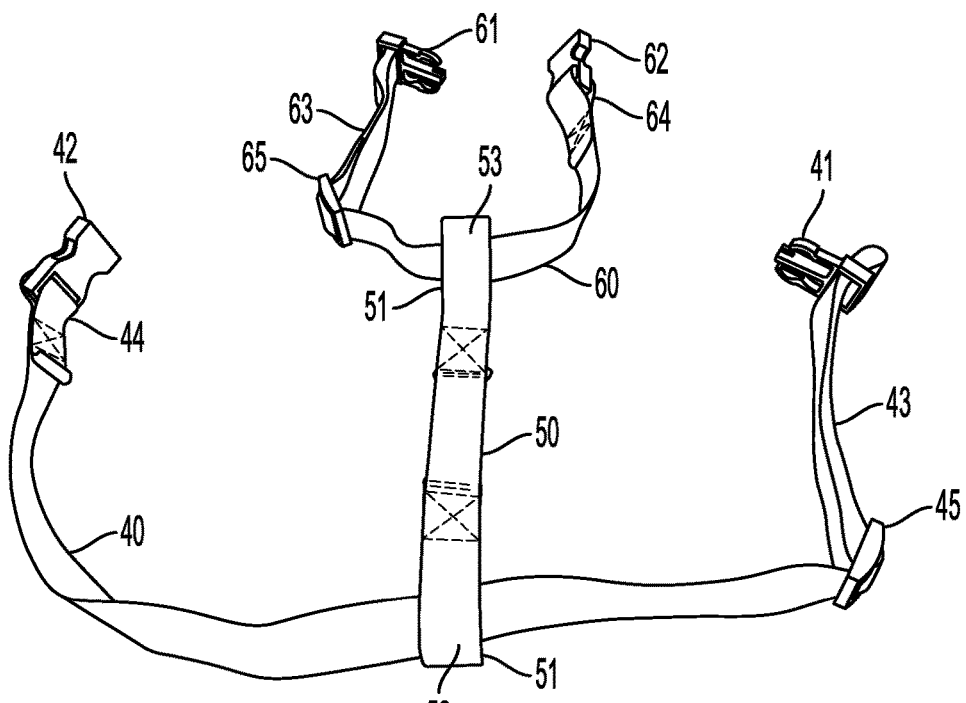
FIG. 5 shows the straps of a breeding guard independent of the apron of a guard.

FIG. 4 is a front view of a breeding guard 10. FIG. 5 shows the straps of breeding guard 10 independent of apron 20 of guard 10. In FIG. 4, girth strap 40 passes through strap tunnel 26 along central concave section 22 of top edge 21 of apron 20 and extends out of end apertures 27. Girth strap 40 has complementary portions of a snapping buckle 41, 42 on each end. In FIG. 4, one end of girth strap 40 has an insertion portion 41 of a snapping buckle mounted on an adjustable loop 43 and on the other end of girth strap 40 a receiver portion 42 of a snapping buckle is mounted on a fixed loop 44. Sliding buckle 45 allows adjustable loop 43 to be changed, which changes the effective length of girth strap 40. The particular arrangements of buckle portions, sliding buckle, and loops can be varied and need not be as shown in FIG. 4. Neck strap 60 has a similar arrangement with an insertion portion 61, receiver portion 62, adjustable loop 63, fixed loop 64 and sliding buckle 65. Again, the particular arrangement of buckles and loops can be varied.

Figure 6:
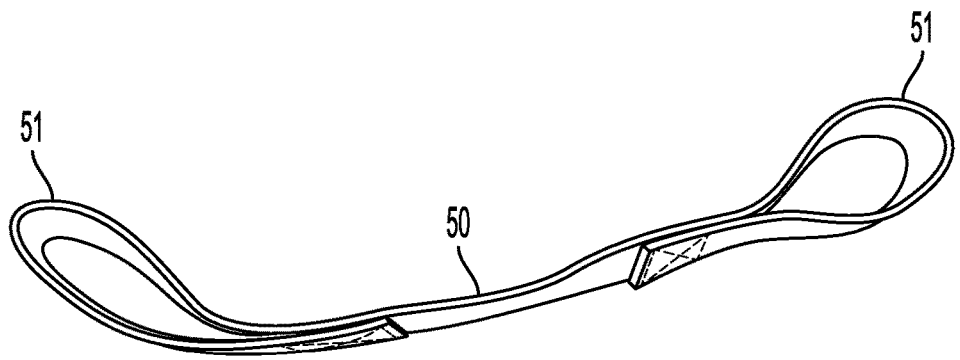
FIG. 6 is an edge view of a sternal strap of a breeding guard, according to one embodiment of the invention.

In FIG. 4, sternal strap 50 connects at one end to neck strap 60 and inserts into intermediate aperture 28 at its other end to connect to girth strap 40. FIG. 5 more clearly shows the connection between sternal strap 50 and girth strap 40. FIG. 6 is an edge view of sternal strap 50 of guard 10. In FIGS. 4, 5, and 6, sternal strap 50 is of fixed length with fixed loops 51 at each end. However, sternal strap 50 could be made with adjustable length with the incorporation of an adjustable loop with a sliding buckle such as with girth strap 40 and neck strap 60.

The straps of the various embodiments of a breeding guard may be made of any appropriate material. For example, the straps may be made of nylon webbing. A common width for nylon webbing is 1 inch width and this provides adequate strength for many applications of the guard. However, if an application requires greater strength, a wider or thicker webbing could be used to increase strength, or a webbing made of a stronger material could be used. Alternatively, various cordage or leather straps could be used for the straps. Additionally, the adjustability and the closing of the straps may be accomplished in any appropriate way. Various sliding buckles may be used to adjust loops in the straps which adjusts the overall lengths of the straps. Sliding buckles are made with widths matching standard nylon webbing widths. Sliding buckles are also made for cordage and leather straps as well. The closure of the straps to form closed loops such as the closure of girth strap 40 or neck strap 60 may be accomplished in any appropriate way. Snapping buckles comprised of two complementary portions are commonly used to couple strap ends. Each complementary portion of the buckle is attached to a respective end of the strap. The two portions snap together to close the strap. However, any appropriate method and/or buckle may be used to close the straps. For example, complementary hooks may be used, or hooks and eyelets, etc.

Figure 7:
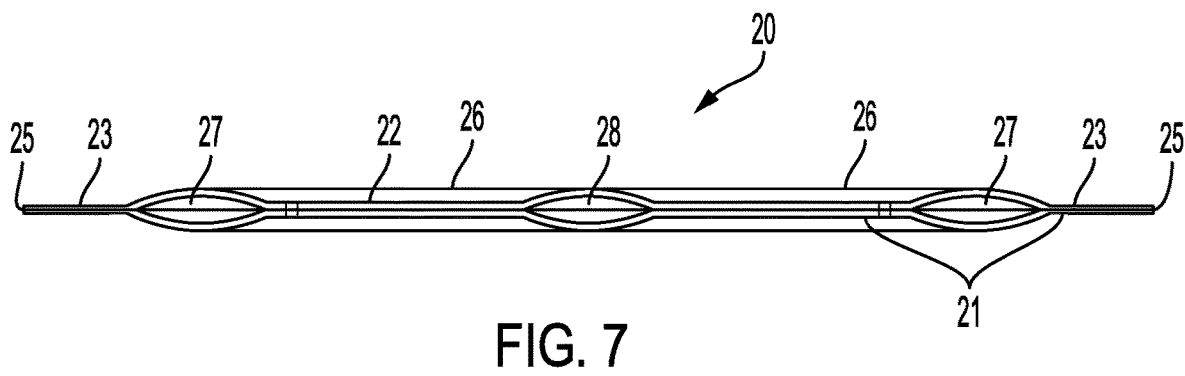
FIG. 7 is a top edge view of an apron of a breeding guard, according to one embodiment of the invention.

FIG. 7 is a top edge view of apron 20 of guard 10. End apertures 27 and intermediate aperture 28 provide access into strap tunnel 26. The added thickness of apron 20 between apertures 27 and 28 is indicative of tunnel 26. Outside of end apertures 27, apron 20 has the thickness of the material of apron 20. In some embodiments of apron 20, strap tunnel 26 may simply be formed by the multiple plies used to construct apron 20, with the apertures giving access to the interior between the plies at specific locations. Other embodiments may have the tunnel created by curling the material over along the central concave section 22 of top edge 21 of apron 20 or a series of strap loops could be used to in effect create a strap tunnel for girth strap 40. All of these approaches would allow apron 20 and girth strap 40 to slide with respect to each other.

Figure 8:
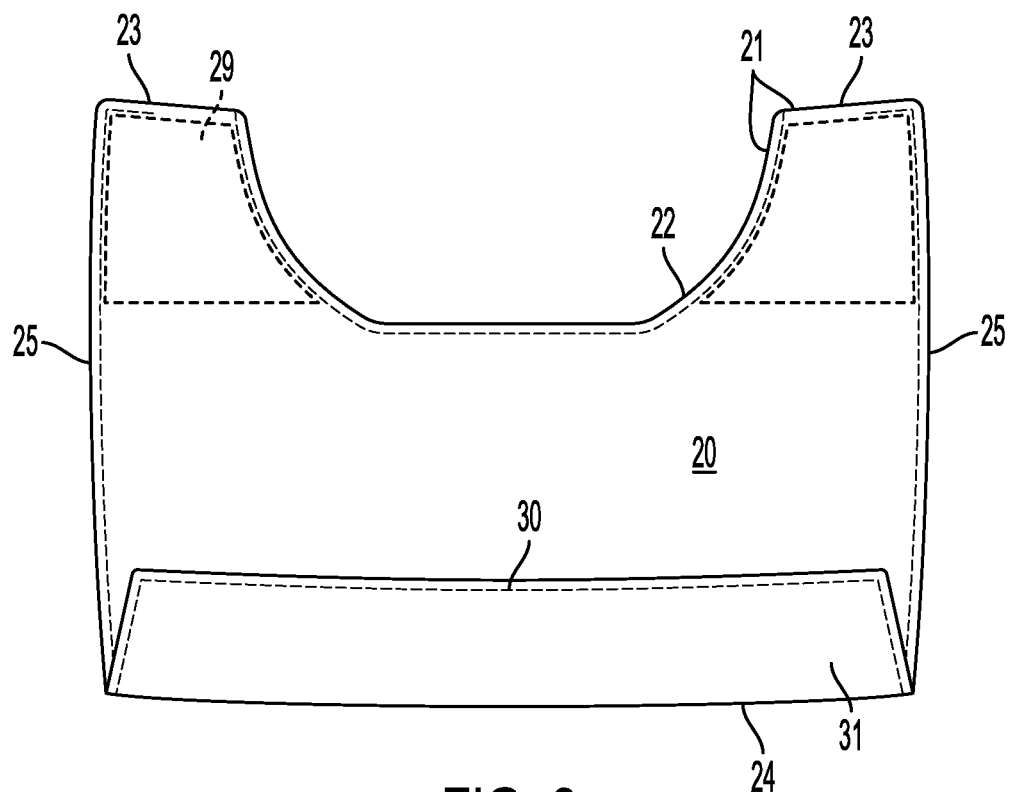
FIG. 8 is a front view of an apron of a breeding guard, according to one embodiment of the invention.
Figure 9:
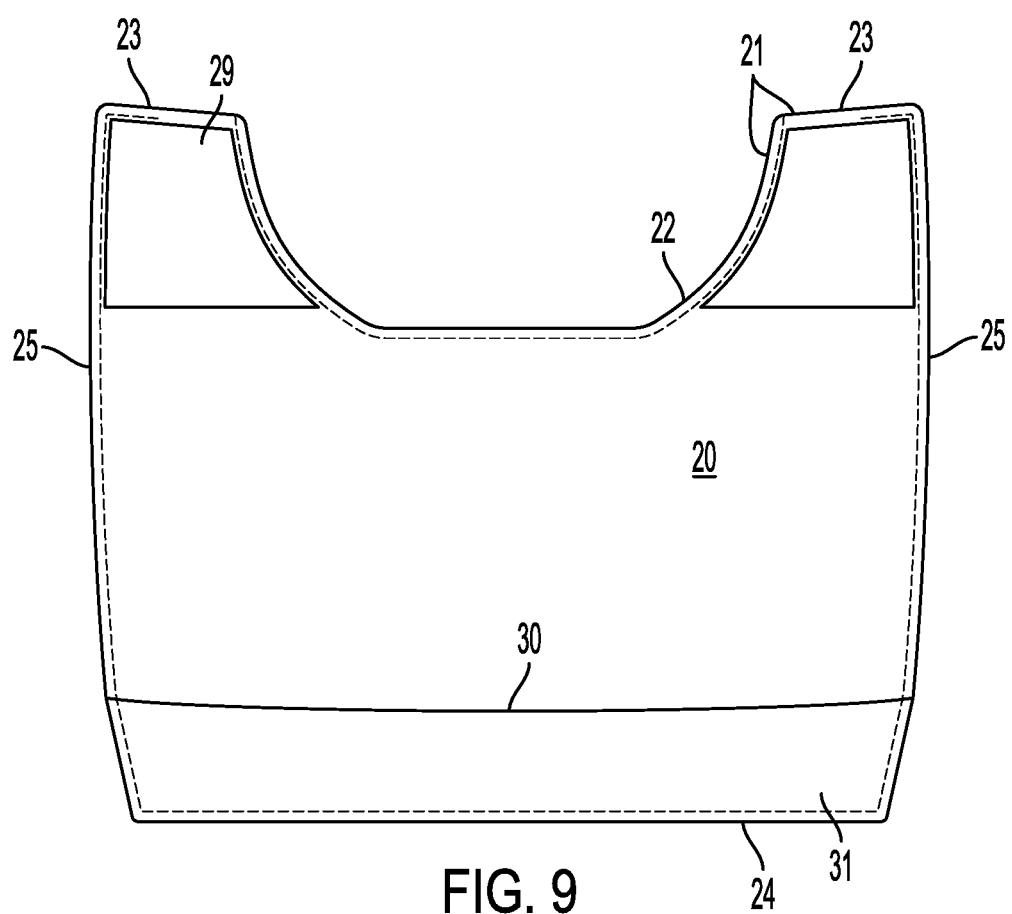
FIG. 9 is a front view of an apron of a breeding guard with an extension released.

FIGS. 8 and 9 show additional embodiments of apron 20. FIG. 8 is a front view of apron 20 of an embodiment of guard 10. Some embodiments of apron 20 may employ reinforcing elements such as insert 29 to assist apron 20 in holding shape. Insert 29 may be made of a more resilient material than that of the bulk of apron 20. As employed in FIG. 8, insert 29 assists extensions 23 of apron 20 to maintain the width of apron 20. In the embodiment shown in FIG. 8, insert 29 is placed between layers of apron 20. In the embodiment shown in FIG. 9, insert 29 is located on the external surface of apron 20. Other types of reinforcing elements could be used, such as wires, rods, frames, etc. and their locations on apron 20 varied. Seam 30 at the bottom of apron 20 maintains a bottom extension 31 of apron 20 in an up position. Other embodiments of guard 10 may employ other methods and materials to secure extension 31, which may be secured with any appropriate method and/or any known effective materials, such as buttons, snaps, zippers, staples, etc. FIG. 9 is a front view of apron 20 of an embodiment of guard 10 with seam 30 cut and bottom extension 31 released. Extension 31 is preferably folded toward the front of apron 20 to prevent urine from seeping into the fold. With bottom extension 31 released, bottom edge 24 becomes the released edge of bottom extension 31. Bottom extension 31 allows apron 20 to be increased in size as the animal grows.

The aprons of the various embodiments of the breeding guard may be made of any suitable material. Depending on the applications, materials of various resiliencies and rigidities may be used. For many applications, nylon Cordura® fabric by Invista provides the desired resistance to wear and resiliency to maintain its shape. Cordura® may be handled as a fabric for the purpose of constructing the guard. Other, more rigid, materials may be used, as well.

Figure 10:
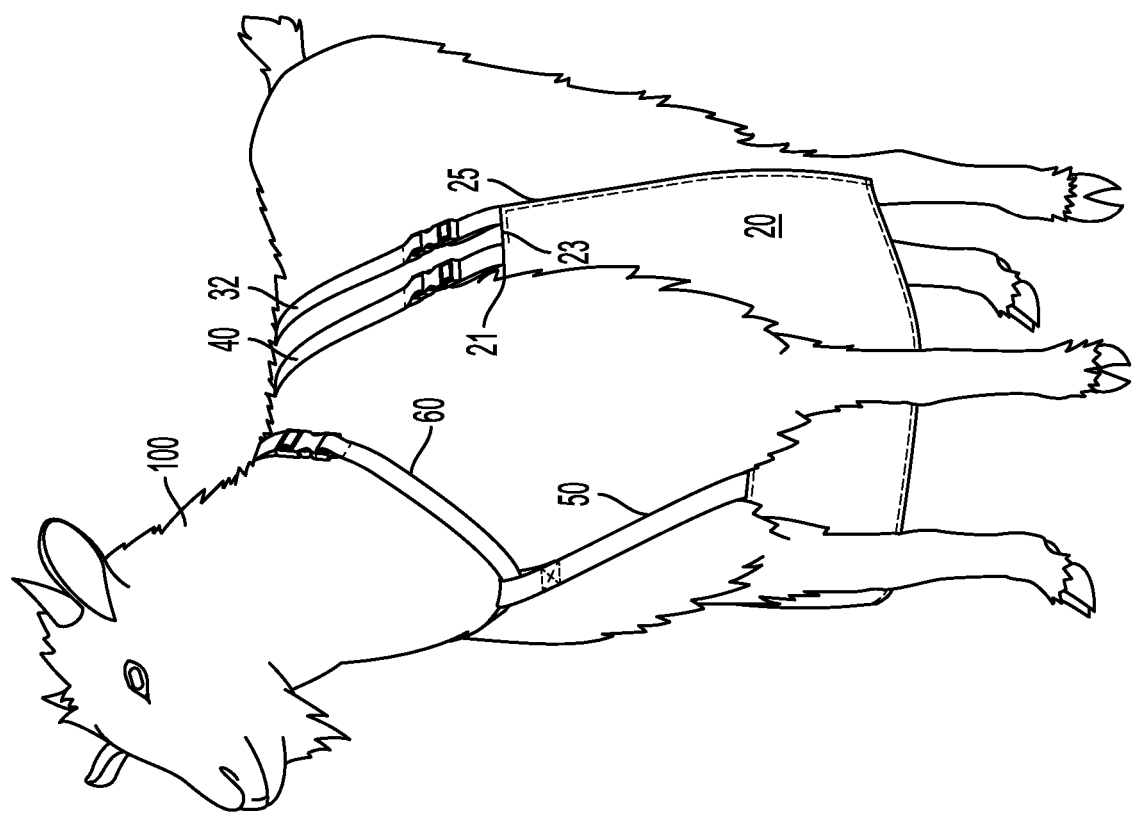
FIG. 10 is a perspective view of an embodiment of a breeding guard in place on a goat with an additional strap at the side edges of the apron.

FIG. 10 is a perspective view of an embodiment of breeding guard 10 in place on a goat 100 with back strap 32 attached to extensions 23 of top edge 21 near sides 25 of apron 20. In the embodiment shown in FIG. 10, back strap 32 attaches at each of its ends to top edge 21 of apron 20 and runs over the back of the animal. This arrangement pulls the side 25 of apron 20 back along the side of the animal while keeping the bottom corners lifted. In this embodiment, apron 20 is given a concave shape facing the back of the animal. Back strap 32 may be added for support when long term application is planned as many materials may become more flexible from extended use. Other embodiments of guard 10 that have back strap 32 may employ apertures in apron 20 and loops in back strap 32 to attach back strap 32 to apron 20. Back strap 32 may also be adjustable in length.

Figure 11:
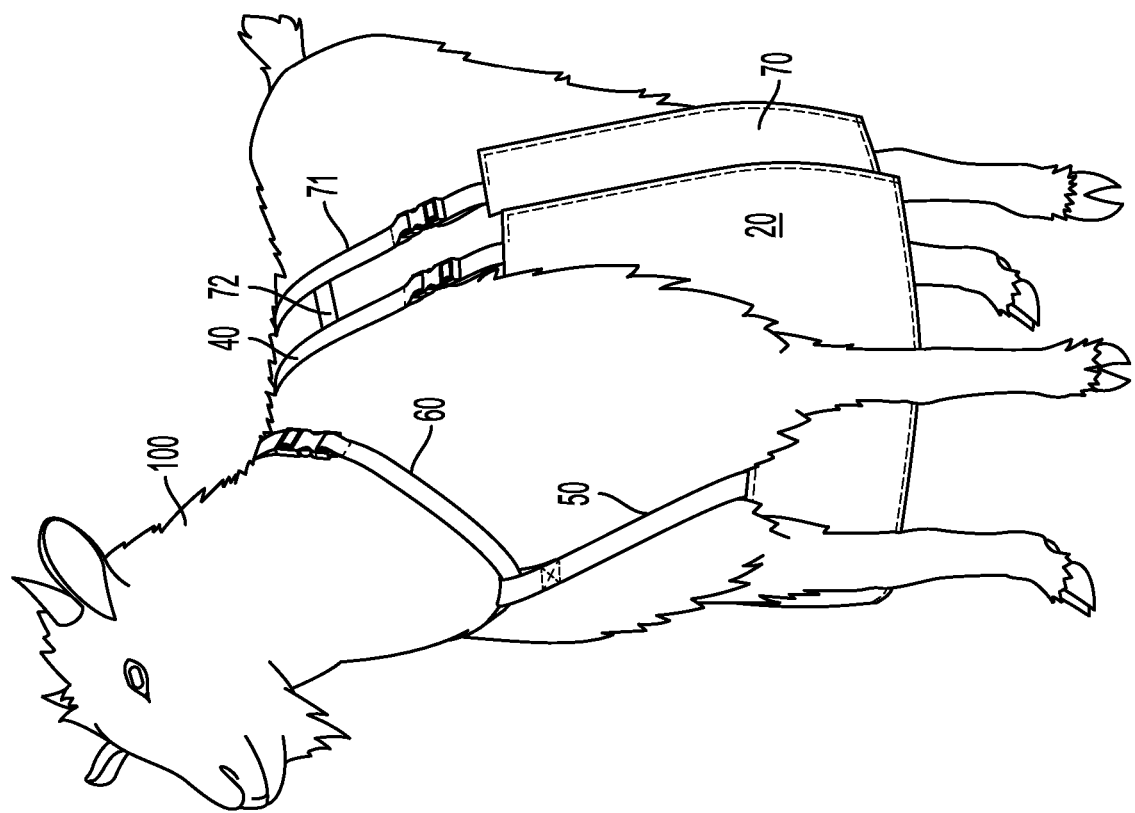
FIG. 11 shows an embodiment of a breeding guard having a second apron and associated straps in place on a goat.

FIG. 11 shows an embodiment of breeding guard 10 having a second apron 70 and associated straps in place on a goat 100. This additional apron may be desirable in some situations, such as for quadrupeds presenting with a short stature and a long torso. In the embodiment of FIG. 11, second apron 70 has its own girth strap, second girth strap 71. Second apron 70 and second girth strap 71 may connect in the same way as apron 20 and girth strap 40 or second girth strap 71 may be sewn directly to second apron 70, or may be connected by any effective known means. Additionally, second girth strap 71 may have the same buckle and adjustment variations as girth strap 40 and neck strap 60. Some embodiments of guard 10 that have a second apron 70 may have a spacer strap 72 to maintain the position of second apron 70 by spacing it from girth strap 40. Spacer strap 72 connects between girth strap 40 and second girth strap 71. Neck strap 60, sternal strap 50, and girth strap 40 support and centrally stabilize second girth strap 71 and second apron 70 via spacer strap 72.

Figure 12:
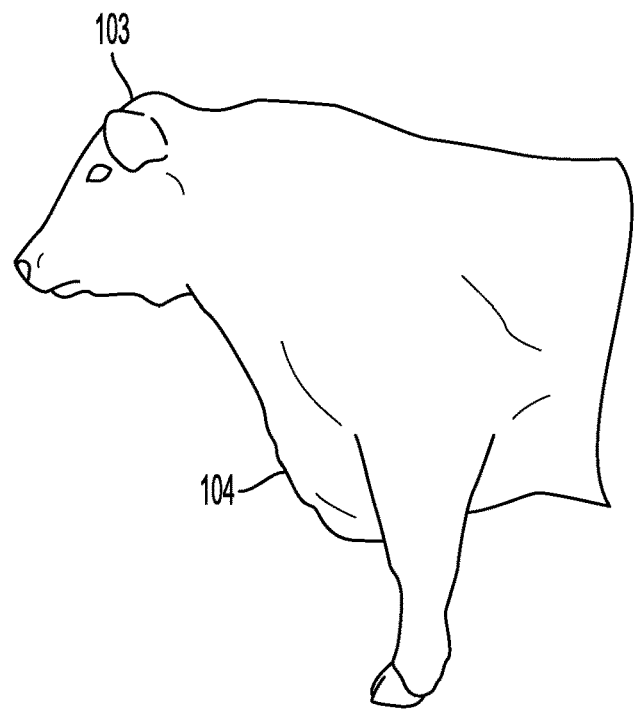
FIG. 12 shows a bovine (bull) with a pronounced dewlap, or otherwise highly convex chest.
Figure 13:
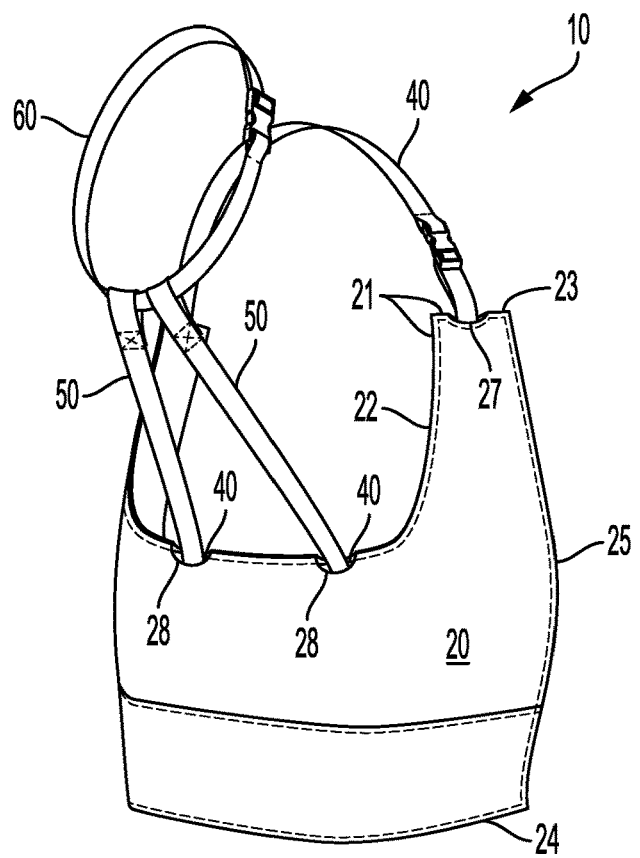
FIG. 13 shows an embodiment of a breeding guard suitable for a quadruped with a highly convex chest.

Some quadrupeds may not present a flat chest. Rather, some present a convex chest shape. FIG. 12 shows a livestock 103 (bull) with a pronounced dewlap 104, or otherwise highly convex chest. FIG. 13 shows an embodiment of breeding guard 10 suitable for a quadruped with a highly convex chest. In the embodiment of FIG. 13, instead of a single central sternal strap 50, the guard employs two sternal straps 50 which pass along each side of the chest, or dewlap, of the animal. In the embodiment of FIG. 13, apron 20 has two intermediate apertures 28 offset from the center of concave segment 22 of top edge 21 of apron 20. Each sternal strap 50 inserts through a respective intermediate aperture 28 to connect to girth strap 40. Each sternal strap 50 also slidably connects to neck strap 60. Sternal straps 50 are maintained in a spaced relationship to each other by the shape of the animal's chest along with the spacing of intermediate apertures 28. The sternal strapping to fit a highly convex chest may also be configured in any effective arrangement, fitting to each side of the pronounced dewlap. Sternal straps 50 maintain apron 20 in the desired longitudinal position along the torso of the animal without requiring a tightly fitting girth strap.

Figure 14:
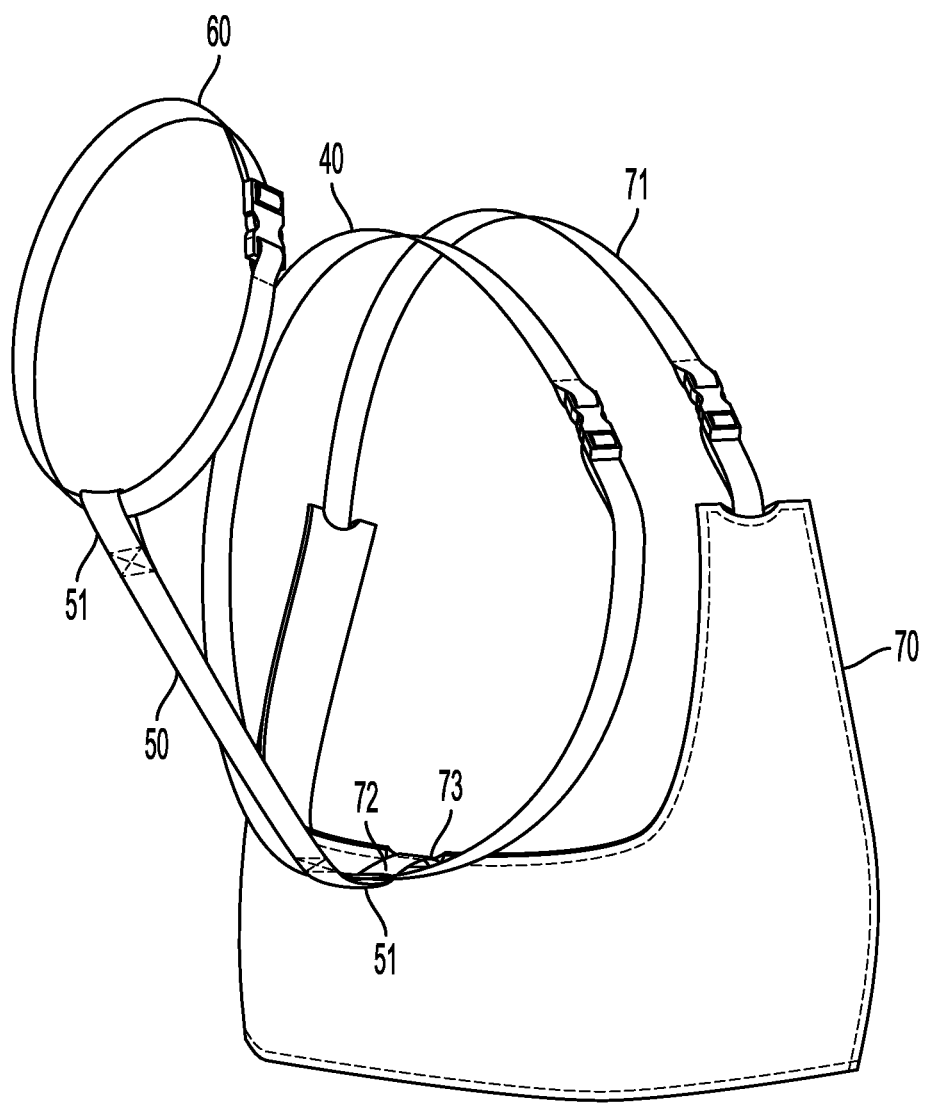
FIG. 14 shows an embodiment of a breeding guard similar to that of FIG. 11, but without the front apron of FIG. 11 and with spacing being maintained by an extension of the sternal strap.

In some situations, it may be desirable to positon a single apron further back along the body of a livestock. This may be due to the particular proportions of a breed of livestock, or for other reasons. FIG. 14 shows an embodiment of breeding guard 10 similar to that of FIG. 11, but without apron 20 of FIG. 11. Also, in the embodiment of FIG. 14, extension 72 of sternal strap 50 maintains the spacing between girth strap 40 and second girth strap 71. Girth strap 40 passes through loop 51 at the bottom. This creates a sliding connection between girth strap 40 and sternal strap 50 and maintains the adaptability of guard 10. Extension 72 of sternal strap 50 extends backward and terminates with loop 73. Girth strap 71 passes through loop 73. This creates a sliding connection between girth strap 71 and extension 72 of sternal strap 50 and the adaptability of guard 10. The use of two girth straps, 40 and 71, maintains the single apron 70 in a position further back along the body of the livestock while maintaining the adaptability of guard 10.

While several embodiments are discussed in this specification, these are for illustrative purposes and should not be taken as a limiting description of the invention. As can be understood from the above description, the breeding guard can have a wide range of embodiments. Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the invention be regarded as including such equivalent constructions.

I claim:

1. A guard for preventing uncontrolled breeding of a livestock, said guard comprising:
    an apron having a bottom edge and a top edge opposite the bottom edge, the top edge having a concave section centrally located in the top edge, the concave section having a length and a strap tunnel along the length, the strap tunnel having an end aperture at each end and an intermediate aperture proximal to the center of the strap tunnel;
    a girth strap in the strap tunnel, the girth strap having two ends and exiting through both end apertures and having complementary fasteners at each end;
    a sternal strap having a first end and a second end with a loop at the first end and a loop at the second end, the first end of the sternal strap inserting into the strap tunnel through the intermediate aperture in the strap tunnel, the girth strap passing through the loop at the first end of the sternal strap; and
    a neck strap, the neck strap having a first end and a second end with complementary fasteners at each end, the neck strap passing through the loop at the second end of the sternal strap.

2. The guard of claim 1, wherein:
    at least one of the girth strap, the neck strap, and the sternal strap is adjustable in length.

3. The guard of claim 1, wherein:
    the bottom edge of the apron is created by folding a bottom portion of the apron up and sewing the apron to itself, the resulting fold defining the bottom edge of the apron.

4. The guard of claim 1, wherein:
    the top edge of the apron has extensions extending beyond the end apertures of the strap tunnel.

5. The guard of claim 4, further comprising;
    a back strap, the back strap having two ends, each end of the back strap connecting to a respective extension of the top edge of the apron.

6. The guard of claim 1, wherein:
    the apron is constructed of two plies of material and the strap tunnel is the space between the two plies.

7. The guard of claim 1, further comprising:
    a second intermediate aperture in the strap tunnel, the second intermediate aperture being proximal to the center of the strap tunnel; and,
    a second sternal strap, the second sternal strap having a first end and a second end with a loop at the first end and a loop at the second end, the first end of the second sternal strap inserting into the strap tunnel through the second intermediate aperture in the strap tunnel, the girth strap passing through the loop at the first end of the second sternal strap and the neck strap passing through the loop at the second end of the second sternal strap.

8. The guard of claim 1, wherein:
the apron comprises reinforcing elements to maintain the shape of the apron.

9. The guard of claim 1, further comprising:
a second apron;
a second girth strap, the second girth strap attaching to the second apron and having two ends and having complementary fasteners at each end; and,
a spacer strap, the spacer strap connecting to the girth strap and the second girth strap and maintaining space between the girth strap and the second girth strap.

10. The guard of claim 1, further comprising:
a second girth strap, the second girth strap connecting to the sternal strap at a point on the sternal strap between the neck strap and the girth strap.

11. A guard for preventing uncontrolled breeding of a livestock, said guard comprising:
an apron having a bottom edge, a top edge opposite the bottom edge, and two side edges connecting the bottom edge and the top edge, the apron having a strap guide along a length of the top edge;
a girth strap having two ends and having complementary fasteners at each end, the girth strap extending through the strap guide, and the complementary fasteners connecting to each other to close the girth strap;
a sternal strap, the sternal strap connecting with the girth strap within the length of the strap guide of the apron; and,
a neck strap, the neck strap having a first end and a second end with complementary fasteners at each end, the neck strap passing through a loop of the sternal strap.

12. A guard for preventing uncontrolled breeding of a livestock, the guard comprising:
an apron having a bottom edge, a top edge opposite the bottom edge, and two side edges connecting the bottom edge and the top edge, the apron having a strap guide along a length of the top edge, the strap guide comprising a strap tunnel in the apron;
a girth strap having two ends and having complementary fasteners at each end, the girth strap extending through the strap guide;
a sternal strap, the sternal strap connecting with the girth strap within the length of the strap guide of the apron; and,
a neck strap, the neck strap having a first end and a second end with complementary fasteners at each end, the neck strap passing through a loop of the sternal strap.

13. The guard of claim 11, wherein:
the sternal strap and the girth strap are connected by passing the girth strap through a loop of the sternal strap.

14. The guard of claim 11, wherein:
at least one of the girth strap, the sternal strap, or the neck strap are adjustable.

15. A guard for preventing uncontrolled breeding of a livestock, the guard comprising:
an apron having a bottom edge, a top edge opposite the bottom edge, and two side edges connecting the bottom edge and the top edge, the apron having a strap guide along a length of the top edge, wherein the top edge of the apron extends beyond the length of the strap guide;
a girth strap having two ends and having complementary fasteners at each end, the girth strap extending through the strap guide;
a sternal strap, the sternal strap connecting with the girth strap within the length of the strap guide of the apron;
a neck strap, the neck strap having a first end and a second end with complementary fasteners at each end, the neck strap passing through a loop of the sternal strap; and,
a back strap having two ends, each end of the back strap attaching to the top edge of the apron proximal to a respective side edge of the apron.

16. The guard of claim 11, further comprising;
a second sternal strap; wherein,
the neck strap connects with the second sternal strap by inserting through a loop of the second sternal strap; and,
the second sternal strap connects with the girth strap within the length of the strap guide, the girth strap inserting through a loop of the second sternal strap.

17. A guard for preventing uncontrolled breeding of a livestock, the guard comprising:
an apron having a bottom edge, a top edge opposite the bottom edge, and two side edges connecting the bottom edge and the top edge, the apron having a strap guide along a length of the top edge;
a girth strap having two ends and having complementary fasteners at each end, the girth strap extending through the strap guide;
a sternal strap, the sternal strap connecting with the girth strap within the length of the strap guide of the apron;
a neck strap, the neck strap having a first end and a second end with complementary fasteners at each end, the neck strap passing through a loop of the sternal strap;
a second girth strap, the second girth strap having two ends and having complementary fasteners at each end;
a second apron attached to the second girth strap; and,
a spacer strap connecting between the girth strap and the second girth strap and maintaining a space between the girth strap and the second girth strap.

18. The guard of claim 11, further comprising:
a second girth strap having two ends and having complementary fasteners at each end, the second girth strap connecting to the sternal strap at a point on the sternal strap between the neck strap and the girth strap.

* * * * *